United States Patent [19]
Kohno et al.

[11] Patent Number: 4,690,111
[45] Date of Patent: Sep. 1, 1987

[54] BEARING ARRANGEMENTS FOR BALANCING SHAFTS OF INTERNAL COMBUSTION ENGINES

[75] Inventors: Kouji Kohno; Hiroichi Takubo; Toshinobu Ito, all of Hiroshima, Japan

[73] Assignee: Mazda Motor Corporation, Hiroshima, Japan

[21] Appl. No.: 792,253

[22] Filed: Oct. 28, 1985

[30] Foreign Application Priority Data

Oct. 29, 1984 [JP] Japan .............................. 59-163306[U]
Oct. 29, 1984 [JP] Japan .............................. 59-163307[U]
Oct. 30, 1984 [JP] Japan .............................. 59-164096[U]

[51] Int. Cl.⁴ .......................... F16F 15/10; F16F 15/26
[52] U.S. Cl. .................................. 123/192 B; 74/603; 74/604
[58] Field of Search ........................ 123/192 B, 192 R; 74/603, 604

[56] References Cited

U.S. PATENT DOCUMENTS

| 1,898,459 | 2/1933 | Newcomb ........................ 123/192 B |
| 2,739,574 | 3/1956 | Scheiterlein .................... 123/192 B |
| 4,000,666 | 1/1977 | Ito et al. ........................... 123/192 B |
| 4,028,963 | 6/1977 | Nakamura et al. ............. 123/192 B |
| 4,095,579 | 6/1978 | Iwasa et al. ..................... 123/192 B |
| 4,508,069 | 4/1985 | Dobler et al. ................... 123/192 B |
| 4,523,553 | 6/1985 | Backlund ........................ 123/192 B |
| 4,556,026 | 12/1985 | Masuda et al. ................. 123/192 B |
| 4,565,169 | 1/1986 | Suzuki ............................. 123/192 B |

FOREIGN PATENT DOCUMENTS

| 57-17223 | 4/1982 | Japan . |
| 58-5553 | 1/1983 | Japan . |
| 58-28456 | 6/1983 | Japan . |
| 59-42234 | 3/1984 | Japan . |

Primary Examiner—Ira S. Lazarus
Attorney, Agent, or Firm—Fleit, Jacobson, Cohn & Price

[57] ABSTRACT

An internal combustion engine having a pair of balancing shafts carrying eccentric balancing weights and driven in a direction of counterbalancing effects of reciprocating parts. Each balancing shaft is positioned to extend in parallel with the crankshaft and supported by bearings of which upper portions are defined by deck portions formed in the cylinder block. Compact arrangements can be accomplished by the locations of the balancing shafts.

11 Claims, 5 Drawing Figures

BEARING ARRANGEMENTS FOR BALANCING SHAFTS OF INTERNAL COMBUSTION ENGINES

BACKGROUND OF THE INVENTION

1. Field of the Invention

The present invention relates to an internal combustion engine and more particularly to an internal combustion engine having balancing means. More specifically, the present invention pertains to bearing means of the balancer shaft for such internal combustion engine.

2. Description of the Prior Art

In reciprocating piston engines, vibrations are produced due to the mass of reciprocating parts. In order to eliminate such vibrations, proposals have been made to provide balancer shafts carrying balancing weights and rotate the balancer shafts to thereby counterbalance the vibrations. For example, Japanese patent application No. 49-119778 filed on Oct. 16, 1974 and published for public inspection on Apr. 21, 1976 under the disclosure No. 51-46607, there is disclosed an engine having a pair of balancer shafts arranged to extend in parallel with the engine crankshaft at the opposite sides of the cylinder block. The balancer shafts are driven through a timing belt by the crankshaft in directions opposite to each other. In the structure disclosed by the Japanese patent application, a substantial amount of balancing torque must be produced so that the balancer shafts must be supported by sufficiently rigid bearing structure. The Japanese patent application teaches to provide such bearing structure at side portions of the cylinder block. However, this solution is not preferable because the cylinder block becomes bulky and complicated in configuration.

Japanese utility model application No. 57-137605 filed on Sept. 13, 1982 and disclosed for public inspection on Mar. 19, 1984 under the disclosure No. 59-42334 discloses an engine wherein a balancer shaft in driven through a gear mechanism by the engine crankshaft. In this engine too, the crankcase is sidewardly expanded to provide a space for arranging the balancer shaft.

SUMMARY OF THE INVENTION

It is therefore an object of the present invention to provide an internal combustion engine having balancing weight means mounted on the cylinder block through bearing means which has a sufficient rigidity but does not make the cylinder block complicated.

Another object of the present invention is to provide bearing means for supporting a balancer shaft of an engine without making the cylinder block complicated and bulky.

A further object of the present invention is to provide simple and effective lubricating means for balancer shaft bearing means.

According to the present invention, the above and other objects can be accomplished by an internal combustion engine including cylinder block means having inner wall means defining at least one cylinder bore, outer wall means provided outside the inner wall means and defining cooling water jacket means with said inner wall means, deck means provided below and continuous with said outer wall means to provide at least partly an upper part of crankcase means, a piston disposed in said cylinder bore for reciprocating movements, crankshaft means disposed in said crankcase means and connected with said piston means so that a reciprocating movement of the piston is converted into a rotation of the crankshaft means, balancing shaft means supported by said cylinder block means in parallel with said crankshaft means and rotated to counterbalance effects of reciprocating mass, said cooling water jacket means having a lower end located above the deck means, said inner wall means having downward extension means extending downwardly beyond the deck means, said downward extension means and said upper part of the crankcase means defining balancing shaft case means wherein said balancing shaft means is located, said balancing shaft means being supported by bearing means formed in said upper part of the crankcase means at least partly defined by said deck means.

In a preferable aspect of the present invention, the deck means is formed at a heightwise position wherein a lowest one of piston rings of the piston is located when the piston is in the bottom dead center, the lower end of the cooling water jacket means being at a heightwise position above the lowest piston ring, said balancing shaft case being defined outward said downward extension of the inner wall means and below said cooling water jacket means.

In order to provide a proper lubrication of the balancing shaft means, the balancing shaft means is formed with axial oil passage means formed in the balancing shaft means in an axial direction thereof and radial oil passage means extending radially from said axial passage means to bearing surfaces of the balancing shaft means. The balancing shaft means is supported at the bearing surfaces by first bearing means provided in an end wall of the cylinder block means and second bearing means provided in a bulkhead formed in the cylinder block means between the opposite end walls, the second bearing means being formed with oil port means leading from oil passage means formed in the bulkhead means.

The above and other objects and features of the present invention will become apparent from the following descriptions of a preferred embodiment taking reference to the accompanying drawings.

BRIEF DESCRIPTION OF THE DRAWINGS

FIG. 5 is a sectional view taken along the line V—V in FIG. 2.

DESCRIPTION OF THE PREFERRED EMBODIMENTS

Figure 1:
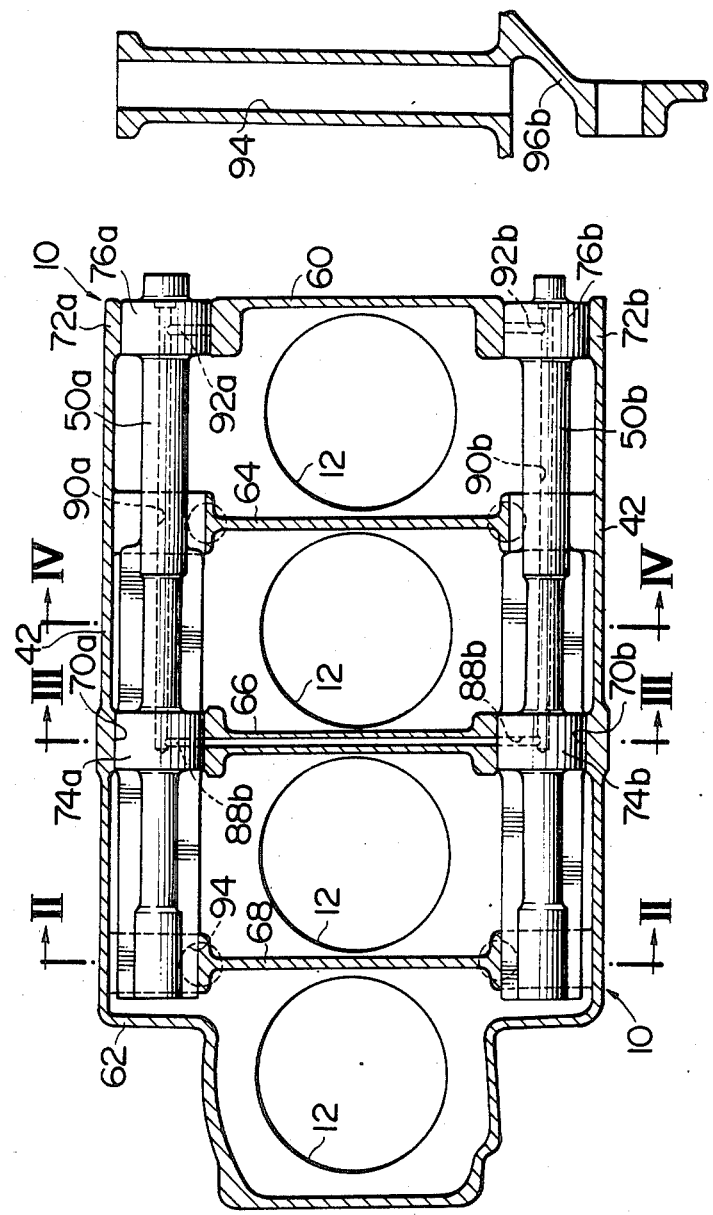
FIG. 1 is a horizontal sectional view of an engine in accordance with one embodiment of the present invention.
Figure 4:
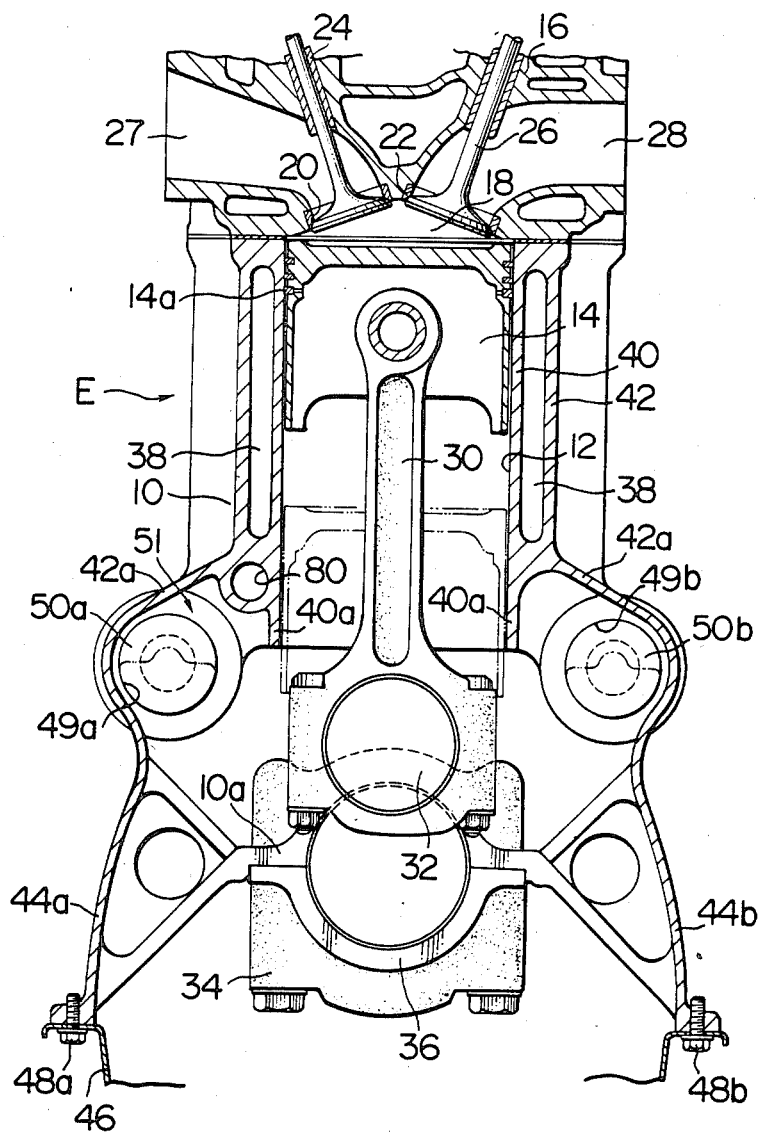
FIG. 4 is a sectional view taken along the line IV—IV in FIG. 1.

Referring to the drawings, particularly to FIGS. 1 and 4, there is shown an engine E including a cylinder block 10 which comprises an inner wall 40 in which a series of cylinder bores 12 are formed. Outside the inner wall 40, there are formed outer walls 42 which define cooling water jackets 38 with the inner wall 40. A cylinder head 16 is attached to the top of the cylinder block 10. A piston 14 is disposed in each cylinder bore 12 for reciprocating movements to thereby define in the cylinder bore 12 a combustion chamber 18 of variable volume. The cylinder head 16 is formed with an intake passage 27 and an exhaust passage 28 which open respectively through an intake port 20 and an exhaust port 22 to the combustion chamber 18. The intake port 20 is provided with an intake valve 24 and the exhaust port 22 is provided with an exhaust valve 26. The piston 14 is connected through a connecting rod 30 with a crankshaft 32.

As shown in FIG. 4, the outer walls 42 of the cylinder block 10 continue to deck portions 42a and 42b which are also continuous with downwardly extending portions 44a and 44b. The deck portions 42a and 42b and the downwardly extending portions 44a and 44b constitute an upper part of a crankcase and an oil pan 46 is connected to the lower ends of the portions 44a and 44b to constitute a lower part of the crankcase. The crankcase 32 is disposed in the crankcase and supported for rotation by main bearings 36 each provided by a bearing half 10a formed in the cylinder block 10 and a bearing cap 34.

Referring to FIGS. 1 and 4, it will be noted that a pair of balancing shafts 50a and 50b are provided at the opposite side portions of the cylinder block 10 to extend in parallel with the crankshaft 32. Each of the balancing shafts 50a and 50b has an eccentric balancing weight and is located in a balance shaft casing 51 which is defined by the deck portion 41a or 42b and an upper portion of the downwardly extending portion 44a or 44b together with a downward extension 40a which extends downward beyond the deck portion 41a or 42b. Although not shown in the drawings, the balancing shafts 50a and 50b are driven by the crankshaft 32 in the direction wherein the effects of reciprocating parts can be counterbalanced. As shown in FIG. 1, the cylinder block 10 has end walls 60 and 62 and intermediate bulkheads 64, 66 and 68 formed between the end walls 60 and 62 to extend in the transverse direction. The balancing shafts 50a and 50b are supported for rotation at bearing surfaces 74a and 74b by bearings 70a and 70b formed in the bulkhead 66 and at bearing surfaces 76a and 76b bearings 72a and 72b formed in the end wall 60.

Figure 3:
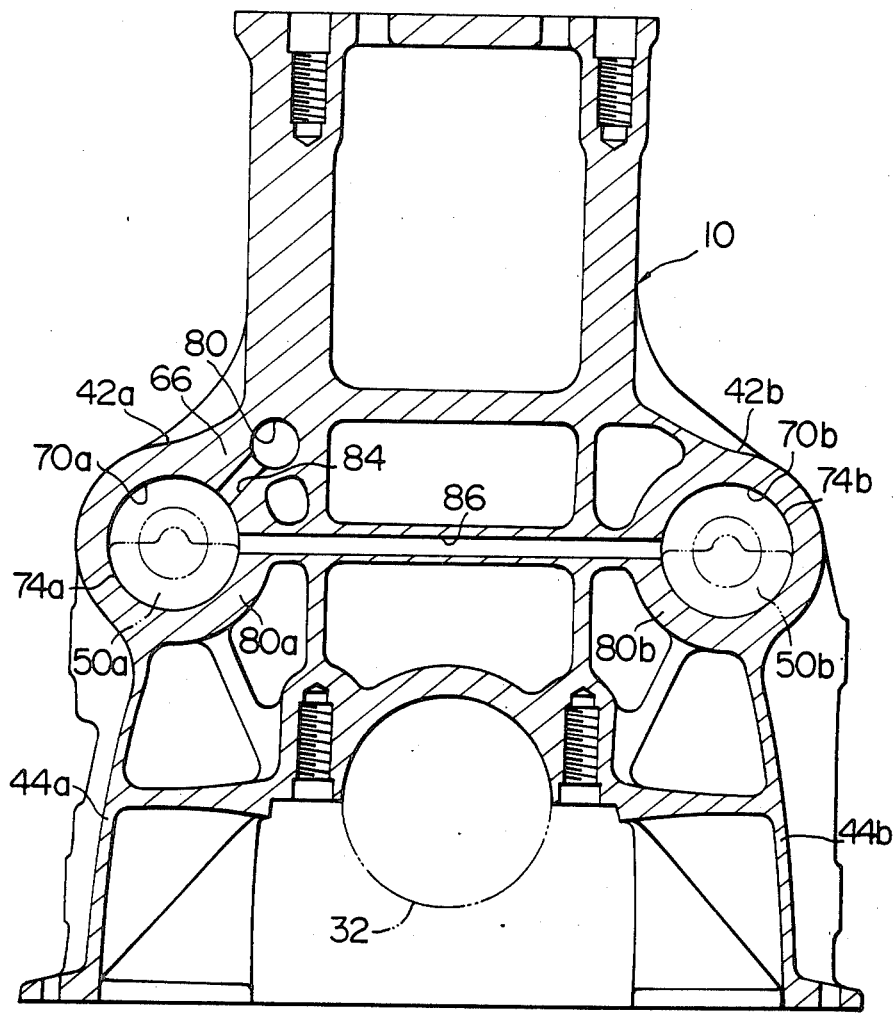
FIG. 3 is a sectional view taken substantially along the line III—III in FIG. 1.

It will be noted in FIG. 4 that the deck portions 42a and 42b are in the heightwise position which is the same as that of the lowest one of the piston rings 14a on the piston 14 when the piston 14 is in the bottom dead center as shown by phantom lines. The cooling water jacket 38 has a lower end slightly above the lowest piston rings 14a in the bottom dead center of the piston 14. Referring to FIG. 3, it will be noted that the deck portions 42a and 42b form upper portions of the bearings 70a and 70b. For the purpose, the deck portions 42a and 42b are of increased thicknesses in the areas of the bearings 70a and 70b and the deck portions 42a and 42b continue to the downwardly extending portions 44a and 44b which are also thickened at the upper portions. Further, arcuate bearing portions 80a and 80b are formed integral with the portions 42a, 42b, 44a and 44b so that rigid supports for the balancing shafts 50a and 50b can be provided in the bulkhead 66. Although not shown specifically in the drawings, the bearings 72a and 72b are also formed rigidly in the end wall 60.

Figure 2:
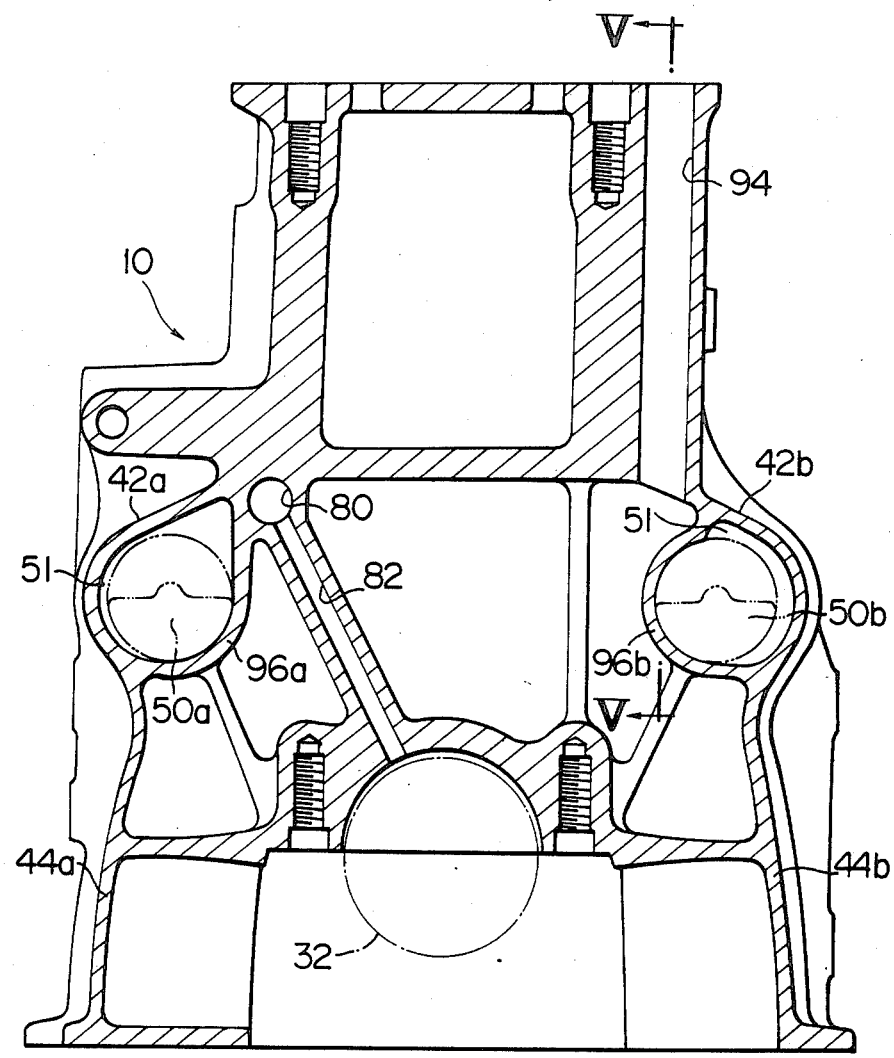
FIG. 2 is a sectional view taken substantially along the line II—II in FIG. 1.

Referring to FIGS. 2, 3 and 4, it will be noted that a main oil passage 80 is formed in the cylinder block 10 in the direction parallel to the balancing shaft 50a. The main oil passage 80 is formed beneath the cooling water jacket 38 close to the intersection between the outer wall 42 and the deck portion 42a. As shown in FIG. 2, the main oil passage 80 is connected through an oil supply passage 82 with an oil passage (not shown) in the crankshaft 32 so that the main oil passage 80 is supplied with lubricant oil from the oil passage in the crankshaft 32 through the oil supply passage 82. In FIG. 3, it will be noted that the main oil passage 80 is opened through a radial oil passage 84 to the bearing surface 70a. Further, a transverse oil passage 86 is formed in the bulkhead 66 to connect the bearing surfaces 70a and 70b. Thus, the lubrication for the bearing surfaces 70a and 70b can be accomplished. As shown in FIG. 1, the balancing shafts 50a and 50b are formed with radial oil passages 88a and 88b which open to the bearing surfaces 74a and 74b. The radial oil passages 88a and 88b are respectively connected with axial oil passages 90a and 90b formed in the balancing shafts 50a and 50b. The balancing shafts 50a and 50b are further formed with radial oil passages 92a and 92b which is communicated at one ends with the axial passages 90a and 90b and opened at the other ends to the bearing surfaces 76a and 76b. Thus, the lubrication of the bearings 72a and 72b can be accomplished. This arrangements for the lubrication passages are advantageous in that it is not necessary to form a transverse oil passage in the end wall 60 so that the thickness of the end wall 60 can be decreased. As a consequent, it becomes possible.

Referring to FIGS. 2 and 3, it will also be noted that a vertical oil return passage 94 is formed in the bulkhead 68 at the side adjacent to the balancing shaft 50b for returning lubricant oil from the cylinder head 16 to the oil pan 46. Although not shown in the drawings, a similar vertical oil returning passage 94 is formed in the other side. The balancing shafts 50a and 50b are located so that a part of the shafts are beneath these oil return passages 94. In the areas beneath the oil return passages 94, the bulkhead 68 is formed with oil baffles 96a and 96b to cover the balancing shafts 50a and 50b as shown in FIG. 2 and 4. The arrangements are advantageous in that the balancing shafts 50a and 50b can be located closer to the transverse center of the cylinder block 10 so that the side portions of the cylinder block 10 may not necessarily be formed with large, expanded configurations.

The invention has thus been shown and described with reference to a specific embodiment, however, it should be noted that the invention is in no way limited to the details of the illustrated structures but changes and modifications may be made without departing from the scope of the appended claims.

We claim:

1. An internal combustion engine including cylinder block means having inner wall means defining at least one cylinder bore, outer wall means provided outside the inner wall means and defining cooling water jacket means with said inner wall means, deck means provided below and continuous with said outer wall means to provide at least partly an upper part of crankcase means, a piston disposed in said cylinder bore for reciprocating movements, crankshaft means disposed in said crankcase means and connected with said piston means so that a reciprocating movement of the piston is converted into a rotation of the crankshaft means, balancing shaft means supported by said cylinder block means in parallel with said crankshaft means and having eccentric mass means, said balancing shaft means being rotated to counterbalance effects of reciprocating mass in said cylinder block means, said cooling water jacket means having a lower end located above the deck means, said inner wall means having downward extension means extending downwardly beyond said deck means, said downward extension means and said upper part of said crankcase means defining balancing shaft case means, said balancing shaft means being located in said balancing shaft case means, said balancing shaft means being supported by bearing means formed in said upper part of said crankcase means at least partly defined by said deck means, said eccentric mass means being located in said cylinder block means and housed at least partly in said balancing shaft case means.

2. An internal combustion engine in accordance with claim 1, wherein said deck means is formed at a heightwise position so that a lowest one of piston rings of said piston is located adjacent to said deck means when said piston is located in a bottom dead center position, a lower end of said cooling water jacket means being at a heightwise position above said lowest piston ring, said balancing shaft case being defined outward from said downward extension of said inner wall means and below said cooling water jacket means.

3. An internal combustion engine in accordance with claim 1, wherein said cylinder block means is formed with main lubricating oil passage means formed by said outer wall means, said deck means and said downward extension means in a portion adjacent to a junction between said outer wall means, said deck means and said downward extension means, said main lubricating oil passage means extending substantially in parallel with said crankshaft means.

4. An internal combustion engine in accordance with claim 1, wherein said cylinder block means includes end walls and at least one transverse bulkhead, said balancing shaft means being supported by first bearing means formed in one of said end walls and second bearing means formed in said bulkhead, said balancing shaft means having axially extending first oil passage means and radially extending second oil passage means opening said first oil passage means respectively to said first and second bearing means, said bulkhead being formed with oil passage means for supplying lubricant oil to said second bearing means whereby said first bearing means is lubricated by the lubricant supplies through said first and second oil passage means in said balancing shaft means.

5. An internal combustion engine in accordance with claim 4, wherein said oil passage means in said bulkhead includes main passage means extending substantially in parallel with said crankshaft means, oil supply passage means connecting said main passage means with bearing means for the crankshaft means to that the lubricant in said bearing means for said crankshaft means is supplied to said main passage means, and radial passage means connecting said main passage means with said second bearing means.

6. An internal combustion engine in accordance with claim 1, wherein said balancing shaft means includes a pair of balancing shafts located at the opposite sides of the cylinder bore and symmetrical with each other with respect to a vertical plane containing a longitudinal axis of said crankshaft means.

7. An internal combustion engine in accordance with claim 6, wherein said cylinder block means includes at least one bulkhead extending transversely between its end walls, said balancing shafts being supported by bearings formed in said bulkhead, said bulkhead being formed with an oil passage connecting said bearings, and a main oil passage formed adjacent to one of said bearings to extend substantially in parallel with said crankshaft means and connected with said one bearing.

8. An internal combustion engine including cylinder block means having inner wall means defining a plurality of cylinder bores arranged in a row extending in a first direction, outer wall means provided outside said inner wall means and defining cooling water jacket means with said inner wall means, deck means provided below and continuous with said outer wall means to provide at least partly an upper part of crankcase means, bulkhead means formed in said cylinder block means between each two adjacent cylinder bores and extending substantially perpendicular to said first direction, a piston disposed in each of said cylinder bores for reciprocating movement, crankshaft means disposed in said crankcase means extending in said first direction and connected with said piston means so that a reciprocating movement of said piston is converted into a rotation of said crankshaft means, balancing shaft means supported by said cylinder block means in parallel with said crankshaft means and rotated to counterbalance effects of reciprocating mass in said cylinder block means, said inner wall means having downward extension means extending downwardly beyond said deck means, said downward extension means and said upper part of said crankcase means defining balancing shaft case means, said balancing shaft means being supported by bearing means formed in said bulkhead means at an upper part of said crankcase means at least partly defined by said deck means, said balancing shaft means having eccentric mass means located within said cylinder block means at a side of said cylinder bores and at least partly housed in said balancing shaft case means.

9. An internal combustion engine in accordance with claim 8, wherein said cylinder bores includes a pair of endwise cylinder bores and at least one intermediate cylinder bore, said eccentric mass means extending across one of said bulkhead means at a side of said intermediate cylinder bore, said bearing means being formed on at least one of said bulkhead means in respective sides of said intermediate cylinder bore.

10. An internal combustion engine in accordance with claim 8, wherein said eccentric mass means is formed within a radially inner confine of said bearing means formed on said bulkhead means.

11. An internal combustion engine in accordance with claim 10, wherein said cylinder block means is formed with vertically extending oil return passage means having a lower end opening to said crankcase means, said balancing shaft means being located such that at least a part of said balancing shaft means is positioned beneath said lower end of said oil return passage means, said cylinder block means being formed with oil baffle means beneath said lower end of said oil return passage means to cover said balancing shaft means.

* * * * *